June 13, 1961        C. E. POND        2,988,185

POWER DRIVE MECHANISM

Filed Sept. 8, 1958        7 Sheets-Sheet 1

INVENTOR.
CECIL E. POND
BY M. A. Hobbs
ATTORNEY

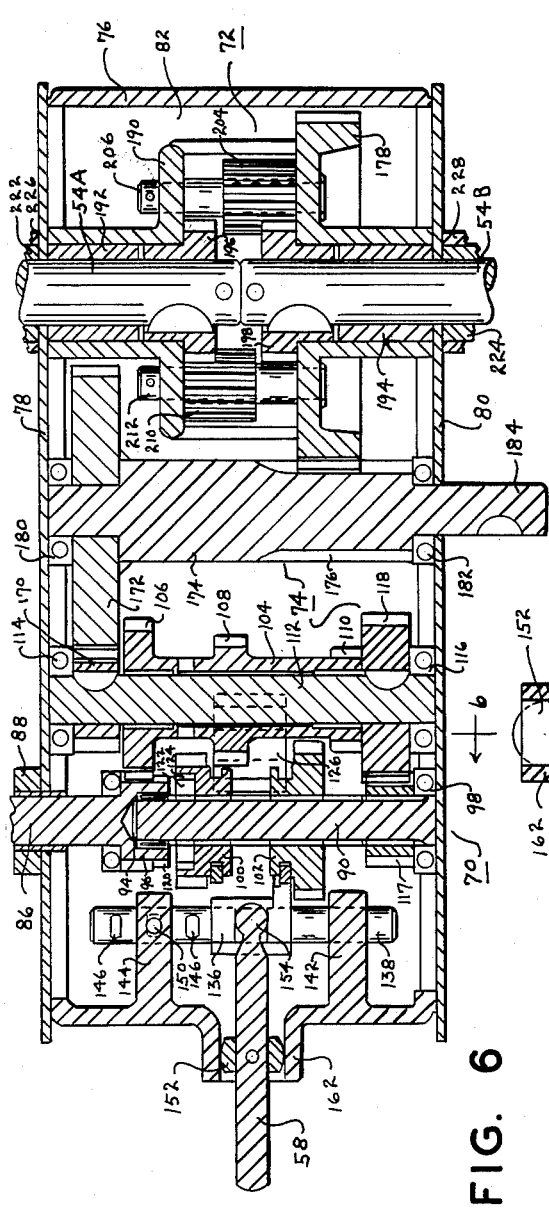

June 13, 1961 C. E. POND 2,988,185
POWER DRIVE MECHANISM
Filed Sept. 8, 1958 7 Sheets-Sheet 4
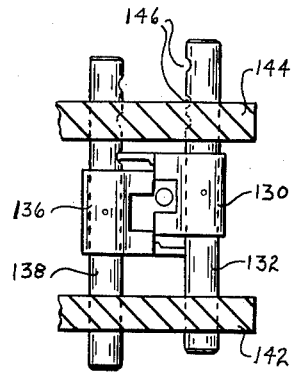
FIG. 10
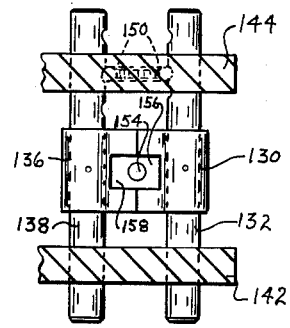
FIG. 9
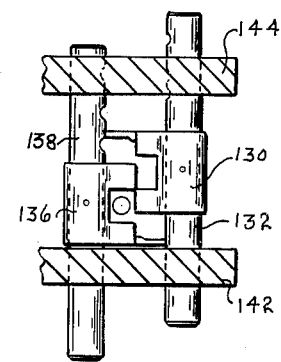
FIG. 11
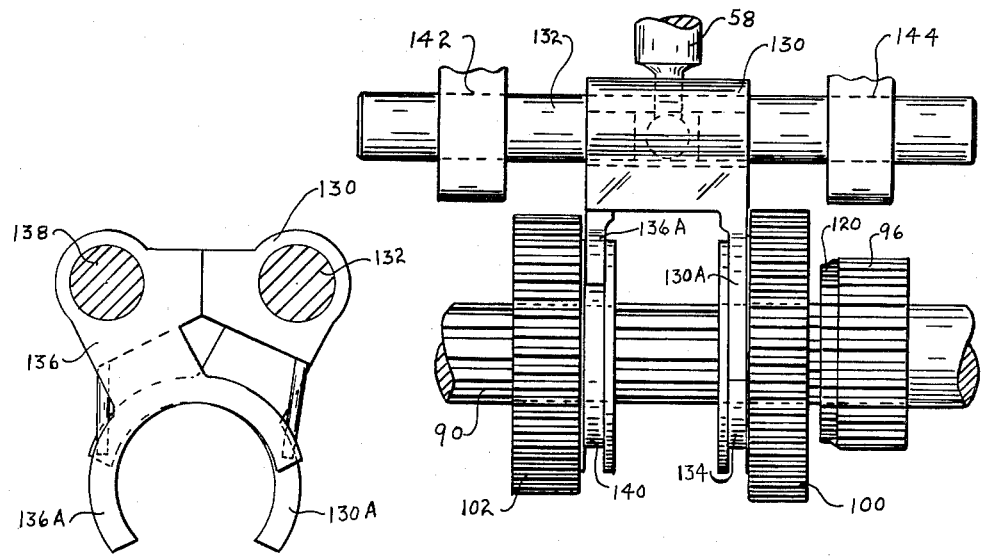
FIG. 7
FIG. 8
*INVENTOR.*
CECIL E. POND
BY M. A. Hobbs
ATTORNEY June 13, 1961

C. E. POND 2,988,185

POWER DRIVE MECHANISM

Filed Sept. 8, 1958

INVENTOR.
CECIL E. POND
BY M. A. Hobbs
ATTORNEY

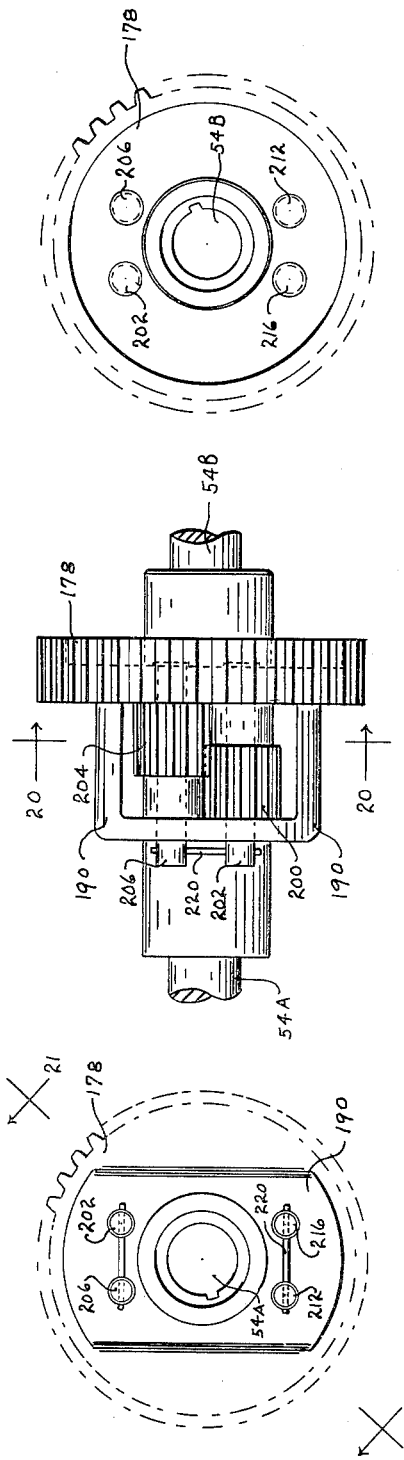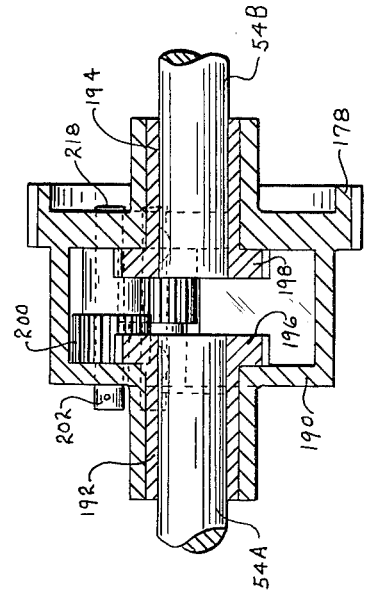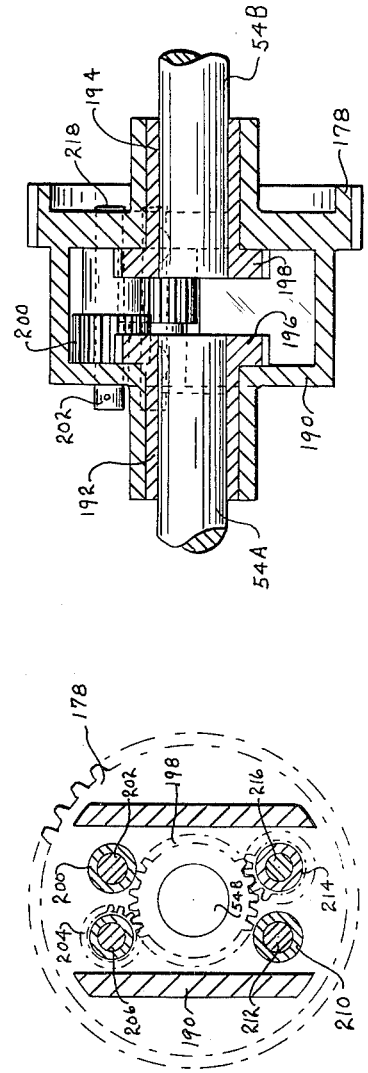

United States Patent Office 2,988,185
Patented June 13, 1961

2,988,185
POWER DRIVE MECHANISM
Cecil E. Pond, South Bend, Ind., assignor to Wheel-Horse Products, Inc., South Bend, Ind., a corporation of Indiana
Filed Sept. 8, 1958, Ser. No. 759,671
15 Claims. (Cl. 192—4)

The present invention relates to a power drive mechanism for vehicles and more particularly a transmission for vehicles, such as for example tractors, small trucks and power implements for lawn, garden and farm cultivation.

One of the principal objects of the present invention is to provide a compact, easy to operate drive unit for vehicles, containing a transmission, differential, gear reduction, clutch and a braking mechanism all controlled by a single lever and a foot pedal.

Another object of the invention is to provide a drive mechanism of the foregoing type for a tractor or the like which is relatively simple in construction and operation and which can be assembled as a separate unit and then mounted in the vehicle as an integral part of the frame.

Still another object is to provide a sturdy, durable transmission and differential combination unit which can be easily serviced and repaired and which requires only a relatively smally amount of lubrication to maintain it in optimum operating condition.

A further object of the invention is to provide a drive mechanism having a brake and clutch operated by a single pedal such that the mechanism is automatically declutched whenever braking action is required.

Another object of the invention is to provide a relatively small powerful transmission mechanism for tractors or the like, having three speeds forward and a reverse and containing a single braking mechanism adapted to effectively and efficiently brake the two rear wheels of the tractor.

Another object is to provide durable, light weight operating parts for the aforesaid transmission, which can be easily and accurately fabricated and which will withstand prolonged rigorous operating conditions.

The present power drive mechanism is designed primarily for tractors and lawn care and soil cultivating equipments for use in suburban areas, by inexperienced, mechanically untrained and unskilled operators and consequently must be relatively light in weight, sturdy and versatile and must be capable of long use and wear with little attention and servicing. The present drive mechanism has been developed and constructed to meet these conditions fully and to be handled and operated efficiently and safely without special instructions or mechanical skill. These and other objects and advantages will become readily apparent from the following description and the accompanying drawings, wherein:

FIGURE 5 is a side elevational view of the drive mechanism with one of the sides removed, showing the gears and shafts in outline in their actual position in the housing;

FIGURE 6 is a cross sectional view of my drive mechanism taken on line 6—6 of FIGURE 5 thus placing most of the gears and shafts on a common plane to better illustrate the relationship of the gears and shafts to one another;

FIGURE 7 is an enlarged elevational view of the gear shift mechanism forming a part of my drive mechanism;

FIGURE 8 is an end view of the gear shift mechanism shown in FIGURE 7;

FIGURES 9, 10 and 11 are plan views of the gear shift mechanism, showing the parts thereof in the positions assumed for the various speeds of the transmission;

FIGURE 17 is a plan view of a differential forming a part of my drive mechanism;

FIGURES 18 and 19 are left and right hand end views of the differential shown in FIGURE 17;

FIGURE 20 is a vertical cross sectional view of the differential taken on line 20—20 of FIGURE 17; and FIGURE 21 is a cross sectional view of the differential taken on line 21—21 of FIGURE 18.

Figure 1:
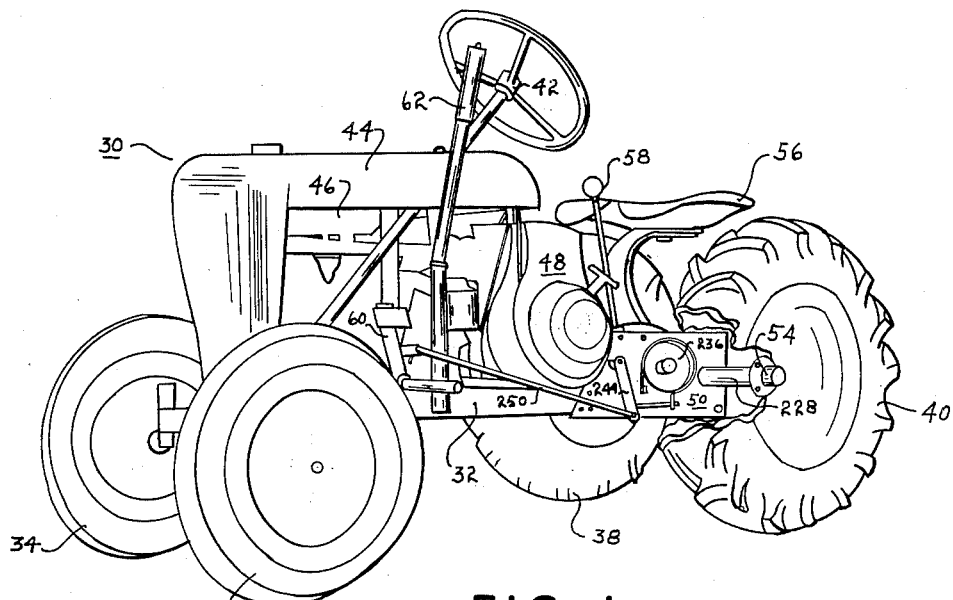
FIGURE 1 is a perspective view of a suburban type tractor with one of the rear wheels broken away to show the position and relative size of my power drive mechanism in the tractor.
Figure 2:
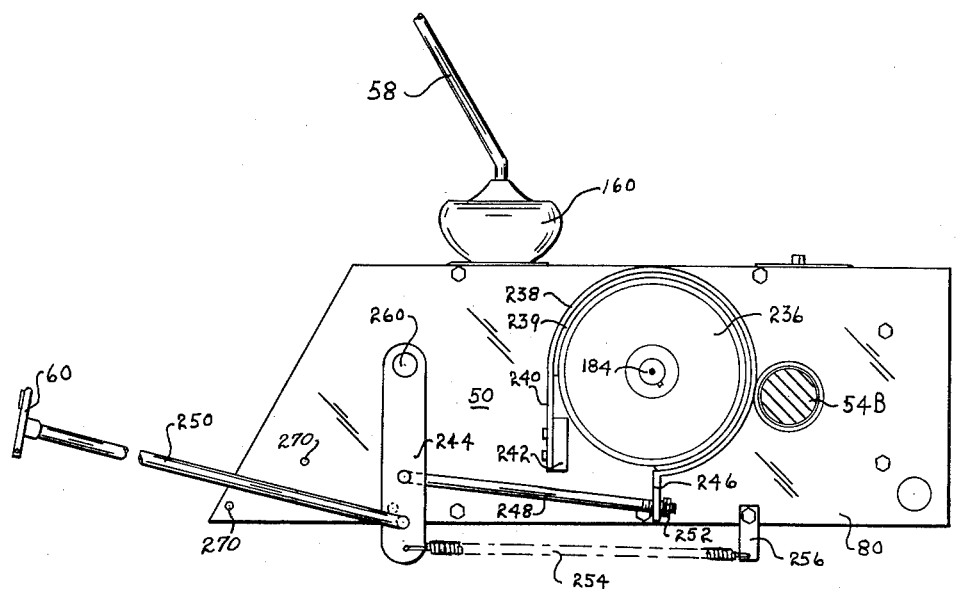
FIGURE 2 is a side elevational view of the drive mechanism removed from the tractor, including parts of the operating levers therefor.
Figure 3:
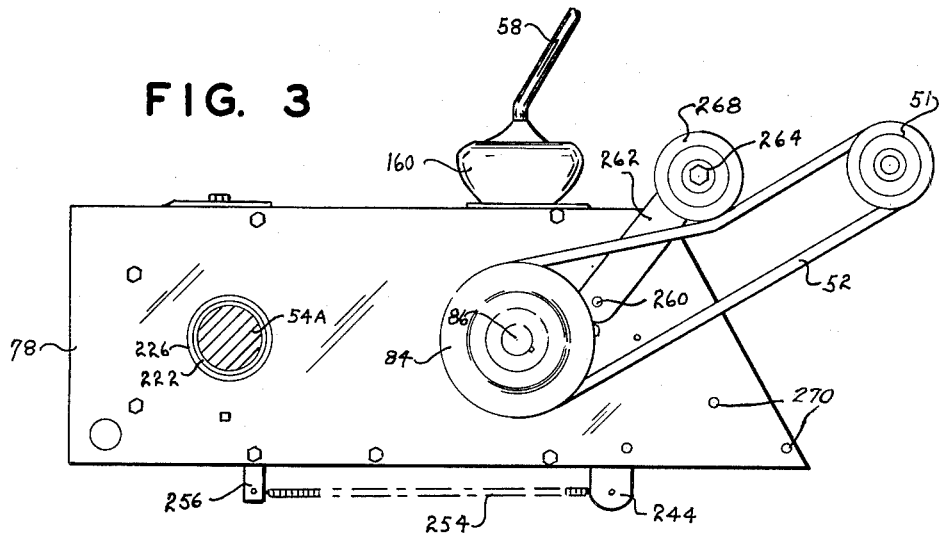
FIGURE 3 is an elevational view of the other side of my drive mechanism removed from the tractor.
Figure 4:
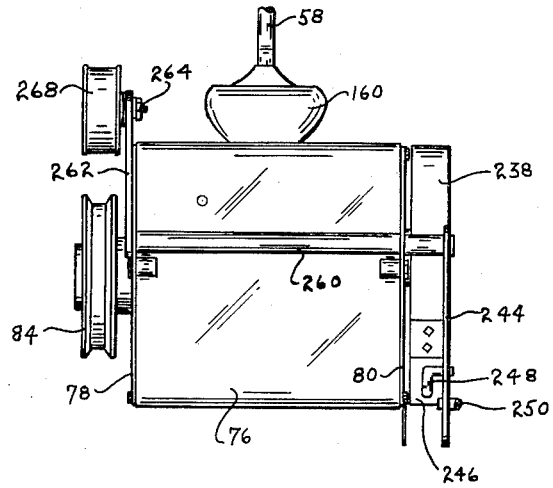
FIGURE 4 is a front elevational view of the drive mechanism shown in the preceding figures.

Referring more specifically to the drawings and to FIGURE 1 in particular, numeral 30 designates generally a small tractor designed primarily for suburban use, including a frame 32, front wheels 34 and 36, rear wheels 38 and 40, a steering mechanism 42, and a hood 44 enclosing a fuel tank 46 and gasoline engine 48. Numeral 50 indicates my power drive mechanism which is shown rigidly secured to and forming a part of the tractor frame and which is driven by engine or motor 48 through its pulley 51 and a V-belt 52 and is connected to the rear wheels by an axle 54. The operator sits on a seat 56 mounted on the housing of the drive mechanism and controls mechanism by manipulating gear shift lever 58 and brake and clutch pedal 60. A hand lever 62 conveniently located on the tractor is provided for controlling the implements being pulled or driven by the tractor. For the purpose of the present description the parts of the tractor not forming a part of my power drive mechanism and the controls therefor may be considered conventional in construction and operation and will not be described in detail herein.

The present power drive mechanism 50 includes a transmission 70, differential 72, and speed reduction gearing 74, operatively connected in a compact arrangement and enclosed in a housing 76 with side plates 78 and 80 thereof supporting the various parts of these mechanisms, the housing including the side plates forming a sealed chamber 82 for retaining a lubricant for said mechanisms. The transmission is driven from belt 52 through a pulley 84 mounted on a power input shaft 86 which in turn is journaled in a bearing 88 secured to side plate 78. A spline shaft 90 is axially aligned with shaft 86 and journaled at one end in a bearing recess 94 of a gear 96 rigidly secured to shaft 86 and journaled at the other end in a bearing 98 secured to shaft 86 and journaled at the other end in a bearing 98 secured to the internal wall of plate 80, shafts 86 and 90 being adapted for independent relative rotation. Two gears 100 and 102 are mounted on spline shaft 90 for rotation therewith and are adapted to move axially thereon, gear 100 being the high gear and gear 102 being the low and reverse gear.

Figure 12:
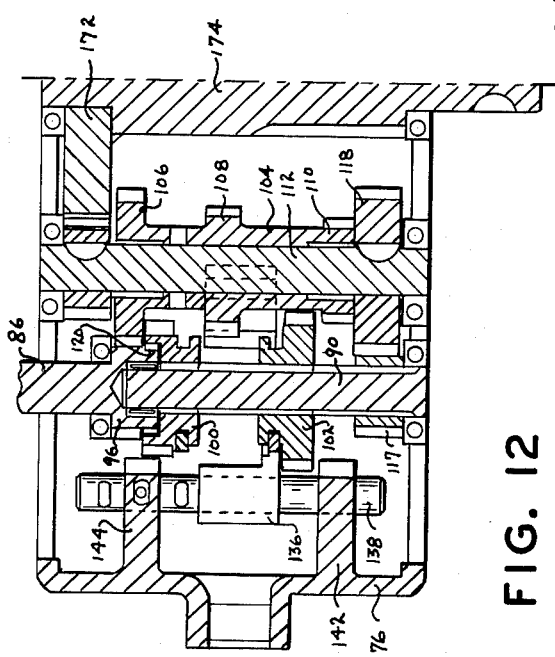

A gear cluster 104 including rigidly connected gears 106, 108 and 110, graduated from large to small in that order, is rotatably mounted on a rotatable shaft 112 journaled at its ends in bearings 114 and 116 supported by plates 78 and 80, respectively. A gear 117 secured to shaft 90 for rotation therewith and a gear 118 secured to shaft 112 intermesh so that said shafts rotate together, but gear 117 being smaller than gear 118, the latter shaft rotates at a reduced speed. Gear 96 is permanently intermeshed with gear 106 of cluster 104 so that the cluster is rotated whenever shaft 86 is being driven by the engine, and contains external gearing 120 forming the male element of a clutch, the female element consisting of a coaxial recessed portion 122 in gear 100 with gearing 124 for interlocking with gearing 120. When the elements 120 and 124 forming the clutch are engaged as shown in FIGURE 12, a direct drive is established between shafts 86 and 112 through spline shaft 90, and gears 117 and 118.

Figure 13:
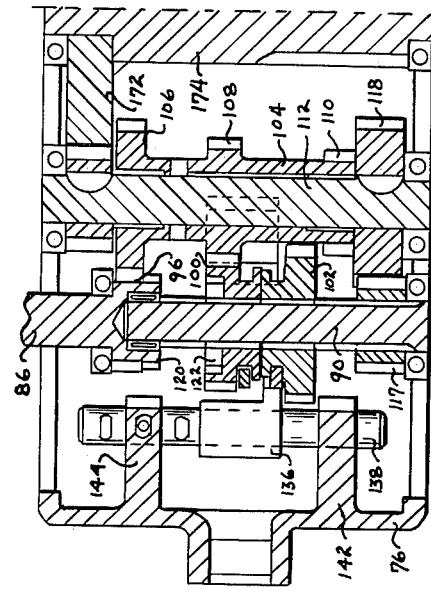
FIGURES 12, 13, 14 and 15 are cross sectional views of a part of my drive mechanism taken on the same sectional line as FIGURE 6, illustrating the positions assumed by the gears for the various speeds, forward and reverse, of the transmission.
Figure 14:
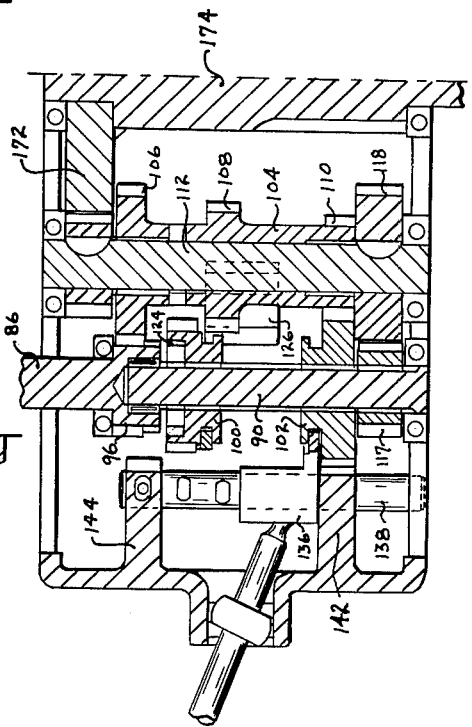
Figure 15:
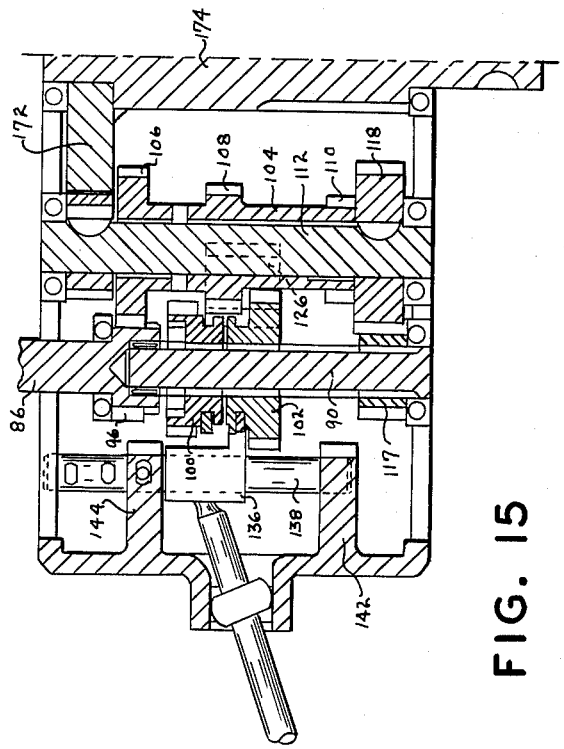
Figure 16:
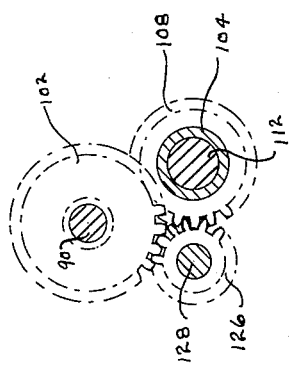
FIGURE 16 is an elevational and partial cross sectional view of the reverse gear train.

Gear 100 is adapted to slide longitudinally on spline shaft 90 and to mesh with gear 108, as shown in FIGURE 13, this providing second speed by establishing a drive from shaft 86 through gear 96, cluster 104, gear 108, to gear 100 and thence through spline shaft 90 and gears 117 and 118 to shaft 112. When gear 100 is intermeshed with gear 108, clutch elements 120 and 124 are fully disengaged so that shafts 86 and 90 can rotate relative to one another, and gear 102 idles on shaft 90. Gear 102 is adapted to slide longitudinally on shaft 90 and mesh with gear 110, as shown in FIGURE 14, providing first or low speed by establishing a drive from shaft 86 through gear 96, cluster 104, gear 110, gear 102 and thence through shaft 90 and gears 117 and 118 to shaft 112. When gear 102 is intermeshed with gear 110, gear 100 is in a neutral or intermediate position between gear 108 and gear 94 idling on shaft 90. Gear 102 is also adapted to intermesh with an idle gear 126 which in turn meshes with gear 108, as shown in FIGURES 15 and 16, and when so intermeshed provides reverse drive for the tractor by establishing a drive from shaft 86 through gear 96, cluster 104, gears 108, 126 and 102 to shaft 90 and thence through gears 117 and 118 to shaft 112. When gear 102 is intermeshed with reverse gear 126, gear 100 is in its neutral position previously described. Gear 126 is journaled on shaft 128 supported by lugs (not shown) on the internal wall of housing 76.

The gear shift mechanism for moving gears 100 and 102 longitudinally along spline shaft 90 is shown in detail in FIGURES 7 through 11 and consists of a first shift fork 130 rigidly mounted on a rail 132 and having a yoke 130A extending into an annular groove 134 in the side of gear 100, and a second shift fork 136 rigidly mounted on a rail 138 and having a yoke 136A extending into an annular groove 140 in the side of gear 102. Rails 132 and 138 are mounted independently for parallel axial movement in holes through spaced lugs 142 and 144 formed integrally with the internal side wall of housing 76. Notches 146 and spring mounted balls 150 assist in retaining the rails and their respective forks in the various selected positions for gears 100 and 102, described above. Forks 130 and 136 are shifted to obtain the desired speed by lever 58 which is mounted in the housing in a ball and socket 152 and is provided with a rounded end 154 for seating in slots 156 and 158 of forks 130 and 136, respectively. The manner in which end 154 is employed to shift the fors to the various positions described herein is illustrated in FIGURES 9, 10 and 11, neutral position for both gears 100 and 102 being when slots 156 and 158 are opposite each other as shown in FIGURE 9. FIGURE 10 shows the position of forks when the transmission is in direct drive and FIGURE 11 shows the position when the transmission is in first or low gear. The ball and socket 152 is protected from dirt and moisture by a rubber boot 160 seated over stem 162 and joined to gear shift lever 58.

The principal gear reduction is obtained in the present drive mechanism by gears 117 and 118 driving shaft 112, small gear 170 mounted on and rotating with shaft 112 and driving a large gear 172 on a shaft 174, and a gear 176 forming a part of shaft 174 and driving the main gear 178 of differential 72. Shaft 174 is journaled in bearings 180 and 182 supported by plates 78 and 80, respectively, and has an extension 184 projecting through plate 80 for receiving a brake drum, described more fully hereinafter. An important feature imparting long life to the mechanism and making possible the present compact design and decreased lubrication requirements is the journaling of gear cluster 104 and shaft 112. The shaft serves as an element in both the transmission and the gear reduction mechanism and also rotates in the same direction as the cluster in all three forward speeds. While the cluster rotates somewhat faster than shaft 112, the relative rotation between the shaft and cluster is small throughout most of the operation of the drive mechanism and consequently results in a minimum amount of wear on the cluster bearing and shaft 112.

Differential 72 is a spur gear type consisting of main gear 178 supported by the differential case 190 and journaled on the right and left rear axle sections 54A and 54B, respectively, with bearing bushings 192 and 194 in each end of the case. Mounted rigidly on the inner end of the axle and for rotation therewith are axle gears 196 and 198 which along with the axle sections are adapted for relative rotation including rotation in opposite directions. The two axle gears are operatively connected by two sets of spider gears, one set consisting of a gear 200 journaled on a pin 202 and meshing with axle gear 196 and a gear 204 journaled on a pin 206 and meshing with axle gear 198 and with gear 200, and the other set consisting of a gear 210 journaled on a pin 212 and meshing with axle gear 196 and a gear 214 journaled on a pin 216 and meshing with axle gear 198 and with gear 210. Pins 202, 206, 212 and 216 are each provided with a head 218 and a removable pin 220 for retaining the pins in place in aligned holes in the end walls of case 190. Rear axle sections 54A and 54B are supported in the drive mechanism by bearings 222 and 224, respectively, disposed in sleeves 226 and 228 rigidly secured to side plates 78 and 80. Since the operation and function of the differential just described are the same as any standard and well known differential used on present day tractors, trucks and automobiles, they will not be described herein.

The present drive mechanism is controlled by two levers, one being the gear shift lever 58, the operation of which has been fully described herein, and the second being the single brake and clutch pedal 60. A brake drum 236 is rigidly mounted on shaft extension 184 and continually rotates with shaft 174 as long as the drive mechanism and consequently the rear wheels of the tractor are rotating. A brake band 238 consisting of a liner 239 supported by steel band 240 anchored at one end to a fixed lug 242 on plate 80 adjacent drum 236 and connected at the other end to pedal 60 by a linkage consisting of a pivoted lever 244 connected to the outturned end 246 of band 240 by a rod 248 and to pedal 60 by a rod 250, both rods being pivotally connected to lever 244 by laterally turned ends extending through holes in the lower part of the lever and being held in the respective holes by cotter pins or the like. Rod 248 passes through and is adapted to slide in a hole in end 246 and is provided with a nut 252 on the end thereof which serves as a stop member for engaging the brake band when the rod is being pulled forward by pressure on pedal 60. This sliding rod and nut arrangement provides a lost motion one-way connection between the brake band and brake pedal and permits the pedal to be moved a substantial distance before the brake is applied. The resiliency of band 238 releases the brake when the operator's pressure is removed from the pedal and the pedal is returned to its raised position by a tension spring 254 attached at one end to lever 244 and anchored at the other end to lug 256 secured to the housing.

Lever 244 is pivoted and rigidly connected to one end of a rotatable shaft 260 which extends through side plates 78 and 80 and carries a lever 262 on the other end thereof. Lever 262 is rigidly connected to shaft 260 and has mounted on the free end a shaft 264 and a freely rotating pulley 268. This pulley rides the main drive belt 52 connecting the motor with pulley 84 and under the force of spring 254 applies the pressure necessary to tighten the belt to effectively drive the tractor. When pressure initially is applied by the operator to pedal 60, lever 244 is pulled forward, rotating shaft 260 and lifting the free end of lever 262, and consequently raising pulley 268 away from the belt. This permits the belt to loosen and preferably disengage itself from pulley 51 on the motor or pulley 84 on the input shaft, thus effectively declutching the transmission to permit the tractor to stop and/or the operator to shift gears. When further pressure is applied to pedal 60, nut 262 engages band 238 and tightens the band around drum 236, this braking effect being transmitted through shaft 174, gears 176 and 178 and the differential and axle sections 54A and 54B to the rear wheels which thus effectively retard the momentum of the tractor. When the operator releases the pressure on the pedal, the brake is first released and then pulley 268 is pressed firmly downwardly by the force of spring 254 again tightening belt 52 sufficiently to drive pulley 84, and placing the tractor in operation.

After the parts have been assembled in housing 76 and side plates 78 and 80 have been bolted firmly in place on the housing with a gasket between the plates and housing to form an oil and dirt tight seal, the assembly is then mounted as a unit onto the rear end of main frame 32 by inserting bolts through holes 270 and becomes a part of the frame structure supported by the front and rear axles. This construction facilitates construction and servicing of the present drive mechanism and eliminates bulky frame and support members which would otherwise be required.

While the present power drive mechanism has been described in connection with a suburban tractor for which it has been primarily designed, it can be satisfactorily used on other types of vehicles and can be varied in size and sturdiness to suit requirements. Various changes and modifications can be made in the present mechanism without departing from the scope of the invention. Most of the moving parts used in the present power drive mechanism are machined from steel; however, it has been found particularly advantageous to make gear shift forks 130 and 136 by a sintered metal process, thus eliminating a number of difficult machining operations as well as providing an accurate, long-wearing part.

I claim:

1. A power drive and control mechanism for a tractor and the like, comprising a housing, a power input shaft, a pulley on one end of said shaft, a belt for connecting said pulley to a motor, a gear disposed on the other end of said shaft and having an axially aligned bearing therein and a clutch element thereon, a spline shaft axially aligned with said input shaft and journaled in said bearing for relative rotation with said input shaft, two axially shiftable gears mounted on said spline shaft for rotation therewith, the gear nearest said first mentioned gear having a recessed portion forming a clutch element, a gear fixedly mounted on said spline shaft, forks for moving said shiftable gears on said spline shaft, a lever for independently moving said forks to shift the respective gear, a gear cluster having one gear meshing with said first mentioned gear and two other gears for meshing with the shiftable gears on said spline shaft, a rotatable shaft for said gear cluster parallel to said spline shaft, a gear fixedly mounted on said cluster shaft and meshing with the gear fixedly mounted on the spline shaft, a relatively small speed reduction gear fixedly mounted on said cluster shaft, a speed reduction shaft spaced from said cluster shaft and parallel thereto and having an extension projecting through the housing, a relatively large gear fixedly mounted on said last mentioned shaft and meshing with said first mentioned speed reduction gear, a second gear mounted on said speed reduction shaft, relatively rotatable axially aligned rear axles, a differential including a case journaled on the inner ends of said axles, a gear mounted on said case and meshing with said second gear on the speed reduction shaft, gears fixedly mounted on the inner ends of said axles, two pairs of gears mounted in said case each meshing with one of said rear axle gears and with the gears of the other pair, a brake drum mounted on said shaft extension, a band anchored at one end and extending partially around said drum, a shaft journaled in said housing and extending beyond opposite sides thereof, an arm rigidly mounted on each end of said last mentioned shaft, a rod connecting the free end of said band to one of said arms and having a lost motion connection therein, a rod connecting the same arm with an operating pedal, a shaft connected to the other arm, an idle pulley journaled on said last mentioned shaft and adapted to engage said belt, and a spring operatively connected to the first mentioned arm for urging said idle pulley into engagement with said belt to cause said belt to transmit power to said first mentioned pulley, said idle pulley first being retracted from said belt and the brake then actuated when pressure is applied to said pedal.

2. A power drive and control mechanism for a tractor and the like, comprising a housing, a power input shaft, a pulley on one end of said shaft, a belt for connecting said pulley to a motor, a gear disposed on the other end of said shaft and having an axially aligned bearing therein and a clutch element thereon, a spline shaft axially aligned with said input shaft and journaled in said bearing for relative rotation with said input shaft, two axially shiftable gears mounted on said spline shaft for rotation therewith, the gear nearest said first mentioned gear having a recessed portion forming a clutch element, a gear fixedly mounted on said spline shaft, forks for moving said shiftable gears on said spline shaft, a lever for independently moving said forks to shift the respective gear, a gear cluster having one gear meshing with said first mentioned gear and two other gears for meshing with the shiftable gears on said spline shaft, a rotatable shaft for said gear cluster parallel to said spline shaft, a gear fixedly mounted on said cluster shaft and meshing with the gear fixedly mounted on the spline shaft, a relatively small speed reduction gear fixedly mounted on said cluster shaft, a speed reduction shaft spaced from said cluster shaft and parallel thereto and having an extension projecting through the housing, a relatively large gear fixedly mounted on said last mentioned shaft and meshing with said first mentioned speed reduction gear, a second gear mounted on said speed reduction shaft, relatively rotatable axially aligned rear axles, a differential including a case journaled on the inner ends of said axles, a gear mounted on said case and meshing with said second gear on the speed reduction shaft, a brake drum mounted on said shaft extension, a band anchored at one end and extending partially around said drum, a shaft journaled in said housing and extending beyond opposite sides thereof, an arm rigidly mounted on each end of said last mentioned shaft, a rod connecting the free end of said band to one of said arms and having a lost motion connection therein, a rod connecting the same arm with an operating pedal, a shaft connected to the other arm, an idle pulley journaled on said last mentioned shaft and adapted to engage said belt, and a spring operatively connected to the first mentioned arm for urging said idle pulley into engagement with said belt to cause said belt to transmit power to said first mentioned pulley, said idle pulley first being retracted from said belt and the brake then actuated when pressure is applied to said pedal.

3. A power drive and control mechanism for a tractor and the like, comprising a housing, a power input shaft, a pulley on one end of said shaft, a belt for connecting said pulley to a motor, a gear disposed on the other end of said shaft and having an axially aligned bearing therein and a clutch element thereon, a spline shaft axially aligned with said input shaft and journaled in said bearing for relative rotation with said input shaft, two axially shiftable gears mounted on said spline shaft for rotation therewith, the gear nearest said first mentioned gear having a recessed portion forming a clutch element, a gear fixedly mounted on said spline shaft, forks for moving said shiftable gears on said spline shaft, a lever for independently moving said forks to shift the respective gear, a gear cluster having one gear meshing with said first mentioned gear and two other gears for meshing with the shiftable gears on said spline shaft, a rotatable shaft for said gear cluster parallel to said spline shaft, a gear fixedly mounted on said cluster shaft and meshing with the gear fixedly mounted on the spline shaft, a relatively small speed reduction gear fixedly mounted on said cluster shaft, a speed reduction shaft spaced from said cluster shaft and parallel thereto and having an extension projecting through the housing, a relatively large gear fixedly mounted on said last mentioned shaft and meshing with said first mentioned speed reduction gear, a second gear mounted on said speed reduction shaft, rear axles, a gear means operatively connecting said second gear on the speed reduction shaft with said axle, a brake drum mounted on said shaft extension, a band anchored at one end and extending partially around said drum, a shaft journaled in said housing and extending beyond the opposite sides thereof, an arm mounted on each end of said last mentioned shaft, a rod connecting the free end of said band to one of said arms, a rod connecting the same arm with an operating pedal, a shaft connected to the other arm, an idle pulley journaled on said last mentioned shaft and adapted to engage said belt, and a spring operatively connected to one of said arms for urging said idle pulley into engagement with said belt to cause said belt to transmit power to said first mentioned pulley.

4. A power drive mechanism for a tractor and the like, comprising a housing, a power input shaft, a pulley on one end of said shaft, a belt for connecting said pulley to a motor, a gear disposed on the other end of said shaft and having an axially aligned bearing therein and a clutch element thereon, a spline shaft axially aligned with said input shaft, two axially shiftable gears mounted on said spline shaft for rotation therewith, the gear nearest said first mentioned gear having a recessed portion forming a clutch element, a gear fixedly mounted on said spline shaft, forks for moving said shiftable gears on said spline shaft, a lever for independently moving said forks to shift the respective gear, a gear cluster having one gear meshing with said first mentioned gear and two other gears for meshing with the shiftable gears on said spline shaft, a rotatable shaft for said gear cluster parallel to said spline shaft, a gear fixedly mounted on said cluster shaft and meshing with the gear fixedly mounted on the spline shaft, a relatively small speed reduction gear fixedly mounted on said cluster shaft, a speed reduction shaft spaced from said cluster shaft and parallel thereto, a relatively large gear fixedly mounted on said last mentioned shaft and meshing with said first mentioned speed reduction gear, a second gear mounted on said speed reduction shaft, relatively rotatable axially aligned rear axles, a differential including a case journaled on the inner ends of said axles, a gear mounted on said case and meshing with said second gear on the speed reduction shaft, gears fixedly mounted on the inner ends of said axles, and two pairs of gears mounted in said case each meshing with one of said rear axle gears and with the gears of the other pair.

5. A power drive mechanism for a tractor and the like, comprising a housing, a power input shaft, a pulley on one end of said shaft, a belt for connecting said pulley to a motor, a gear disposed on the other end of said shaft and having an axially aligned bearing therein and a clutch element thereon, a spline shaft axially aligned with said input shaft and journaled in said bearing for relative rotation with said input shaft, two axially shiftable gears mounted on said spline shaft for rotation therewith, the gear nearest said first mentioned gear having a recessed portion forming a clutch element, a gear fixedly mounted on said spline shaft, forks for moving said shiftable gears on said spline shaft, a lever for independtly moving said forks to shift the respective gear, a gear cluster having one gear meshing with said first mentioned gear and two other gears for meshing with the shiftable gears on said spline shaft, a rotatable shaft for said gear cluster parallel to said spline shaft, a gear fixedly mounted on said cluster shaft and meshing with the gear fixedly mounted on the spline shaft, a relatively small speed reduction gear fixedly mounted on said cluster shaft, a speed reduction shaft spaced from said cluster shaft and parallel thereto, a relatively large gear fixedly mounted on said last mentioned shaft and meshing with said first mentioned speed reduction gear, a second gear mounted on said speed reduction shaft, a rear axle, and a gear means operatively connecting said second gear with said axle.

6. A power drive mechanism for a tractor and the like, comprising a housing, a power input shaft, a gear disposed on the other end of said shaft and having an axially aligned bearing therein and a clutch element thereon, a spline shaft axially aligned with said input shaft and journaled in said bearing for relative rotation with said input shaft, two axially shiftable gears mounted on said spline shaft for rotation therewith, the gear nearest said first mentioned gear having a recessed portion forming a clutch element, a gear fixedly mounted on said spline shaft, forks for moving said shiftable gears on said spline shaft, a lever for independently moving said forks to shift the respective gear, a gear cluster having one gear meshing with said first mentioned gear and two other gears for meshing with the shiftable gears on said spline shaft, a rotatable shaft for said gear cluster parallel to said spline shaft, a gear fixedly mounted on said cluster shaft and meshing with the gear fixedly mounted on the spline shaft, a speed reduction gear fixedly mounted on said cluster shaft, a rear axle, and a gear means operatively connecting said speed reduction gear with said axle.

7. A power drive mechanism for a vehicle, comprising a housing, a power input shaft, a gear disposed on one end of said shaft and having an axially aligned bearing therein and a clutch element thereon, a spline shaft axially aligned with said input shaft and journaled in said bearing for relative rotation with said input shaft, two axially shiftable gears mounted on said spline shaft for rotation therewith, the gear nearest said first mentioned gear having a recessed portion forming a clutch element, a gear fixedly mounted on said spline shaft, a gear cluster having one gear meshing with said first mentioned gear and two other gears for meshing with the shiftable gears on said spline shaft, a rotatable shaft on which said gear cluster rotates parallel to said spline shaft, a gear fixedly mounted on said cluster shaft and meshing with the gear fixedly mounted on the spline shaft, a speed reduction gear fixedly mounted on said cluster shaft, a rear axle, and a gear means operatively connecting said speed reduction gear with said axle.

8. A power drive mechanism for a vehicle, comprising a housing, a power input shaft, a gear disposed on the other end of said shaft and having an axially aligned bearing therein, a spline shaft axially aligned with said input shaft and journaled in said bearing for relative rotation with said input shaft, two axially shiftable gears mounted on said spline shaft for rotation therewith, a gear fixedly mounted on said spline shaft, a gear cluster having one gear meshing with said first mentioned gear and two other gears for meshing with the shiftable gears on said spline shaft, a rotatable shaft for said gear cluster parallel to said spline shaft, a gear fixedly mounted on said cluster shaft and meshing with the gear fixedly mounted on the spline shaft, a drive axle, a speed reduction gear fixedly mounted on said cluster shaft, and a gear means operatively connecting said speed reduction gear with said axle.

9. A power drive mechanism for a vehicle, comprising a housing, a power input shaft, a pulley on one end of said shaft, a belt for connecting said pulley to a source of power, a gear disposed on the other end of said shaft and having an axially aligned bearing therein, a spline shaft axially aligned with said input shaft and journaled in said bearing for relative rotation with said input shaft, two axially shiftable gears mounted on said spline shaft for rotation therewith, a gear fixedly mounted on said spline shaft, a gear cluster having one gear meshing with said first mentioned gear and two other gears for meshing with the shiftable gears on said spline shaft, a rotatable shaft for said gear cluster parallel to said spline shaft and adapted to rotate relative to said cluster, a gear fixedly mounted on said cluster shaft and meshing with the gear fixedly mounted on the spline shaft, a speed reduction gear fixedly mounted on said cluster shaft, a speed reduction shaft spaced from said cluster shaft and parallel thereto and having an extension, a brake drum mounted on said shaft extension, a band anchored at one end and extending partially around said drum, a shaft journaled in said housing and extending beyond the opposite sides thereof, an arm mounted on each end of said last mentioned shaft, a rod connecting the free end of said band to one of said arms, a rod connecting the same arm with an operating pedal, a shaft connected to the other arm, an idle pulley journaled on said last mentioned shaft and adapted to engage said belt, and a spring operatively connected to one of said arms for urging said idle pulley into engagement with said belt to cause said belt to transmit power to said first mentioned pulley.

10. A power drive and control mechanism for a tractor and the like, comprising a transmission including a housing and a power input shaft, a pulley on one end of said shaft, a belt for connecting said pulley to a motor, a rear axle, a gear means operatively connecting said transmission with said axle, a brake drum connected to said gear means, a band anchored at one end and extending partially around said drum, a shaft journaled in said housing and extending beyond the opposite sides thereof, an arm mounted on each end of said last mentioned shaft, a rod connecting the free end of said band to one of said arms and having a lost motion connection therein, a rod connecting the same arm with an operating pedal, a shaft connected to the other arm, an idle pulley journaled on said last mentioned shaft and adapted to engage said belt, and a spring operatively connected to one of said arms for urging said idle pulley into engagement with said belt to cause said belt to transmit power to said first mentioned pulley, said idle pulley first being retracted from said belt and the brake then actuated when pressure is applied to said pedal.

11. A power drive mechanism for a vehicle, comprising a transmission including a housing and a power input shaft, a pulley on one end of said shaft, a belt for connecting said pulley to a source of power, a rear axle, a gear means operatively connecting said transmission with said axle, a brake drum connected to said gear means, a band anchored at one end and extending partially around said drum, a shaft journaled in said housing and extending beyond opposite sides thereof, an arm mounted on each end of said last mentioned shaft, a rod connecting the free end of said band to one of said arms, a rod connecting the same arm with an operating pedal, a shaft connected to the other arm, an idle pulley journaled on said last mentioned shaft and adapted to engage said belt, and a spring operatively connected to one of said arms for urging said idle pulley into engagement with said belt to cause said belt to transmit power to said first mentioned pulley.

12. A power drive mechanism for a vehicle, comprising a transmission including a housing and a power input shaft, a pulley on one end of said shaft, a belt for connecting said pulley to a motor, rear axles, a differential operatively connected to said transmission and including a case journaled on the inner ends of said axles, gears fixedly mounted on the inner ends of said axles, two gears mounted in said case each meshing with one of said rear axle gears and with the other gear, a brake drum operatively connected to said differential, a band anchored at one end and extending partially around said drum, a shaft journaled in said housing, two arms mounted on said last mentioned shaft, a rod connecting the free end of said band to one of said arms, a rod connecting the same arm with an operating pedal, a shaft connected to the other arm, an idle pulley journaled on said last mentioned shaft and adapted to engage said belt, and a spring operatively connected to one of said arms for urging said idle pulley into engagement with said belt to cause said belt to transmit power to said first mentioned pulley.

13. A power drive mechanism for a vehicle, comprising a transmission including a housing, a power input shaft and a power output shaft, a pulley on said input shaft, a means including a belt connecting said pulley to a source of power, an idle pulley for said belt, a rotatable member operatively connected to said output shaft, a brake drum mounted on said rotatable member, a brake means for engaging said drum, a yieldable means for urging said idle pulley into engagement with said belt, and a manually operated pedal connected to said idle pulley and to said brake for relieving the pressure of said idle pulley on said belt and applying said brake means to said drum.

14. In a power drive mechanism for a vehicle: a housing, a power input shaft, a gear disposed on one end of said shaft, a spline shaft axially aligned with said input shaft, two axially shiftable gears mounted on said spline shaft for rotation therewith, the gear nearest said first mentioned gear having a portion forming a clutch element, a gear fixedly mounted on said spline shaft, a gear cluster having two gears meshing with the shiftable gears on said spline shaft, a shaft on which said gear cluster rotates parallel to said spline shaft, a gear meshing with the gear fixedly mounted on the spline shaft, a speed reduction gear fixedly mounted on said cluster shaft, a rear axle, and a gear means including a differential operatively connecting said speed reduction gear with said axle.

15. In a power drive mechanism for a vehicle: a housing, a power input shaft, a gear on said shaft, a spline shaft axially aligned with said input shaft, two axially shiftable gears mounted on said spline shaft for rotation therewith, a gear fixedly mounted on said spline shaft, a gear cluster having one gear meshing with said first mentioned gear and two other gears for meshing with the shiftable gears on said spline shaft, a shaft on which said gear cluster rotates parallel to said spline shaft, a gear meshing with the gear fixedly mounted on the spline shaft, a speed reduction gear fixedly mounted on said cluster shaft, a rear axle, and a gear means operatively connecting said speed reduction gear with said axle.

References Cited in the file of this patent

UNITED STATES PATENTS

| Number | Name | Date |
|---|---|---|
| 1,250,363 | Schellenbach | Dec. 18, 1917 |
| 2,050,776 | Anderson | Aug. 11, 1936 |
| 2,081,256 | Van Berkel | May 25, 1937 |
| 2,466,814 | Le Blond et al. | Apr. 12, 1949 |
| 2,512,036 | Orr | June 20, 1950 |
| 2,608,102 | Wilken | Aug. 26, 1952 |
| 2,696,741 | Wilken | Dec. 14, 1954 |